(12) United States Patent
    Schelstraete et al.

(10) Patent No.: US 9,686,002 B1
(45) Date of Patent: Jun. 20, 2017

(54) MU-MIMO SNIFFER FOR A WIRELESS LOCAL AREA NETWORK

(71) Applicant: Quantenna Communications, Inc., Fremont, CA (US)

(72) Inventors: Sigurd Schelstraete, Menlo Park, CA (US); Huizhao Wang, San Jose, CA (US); Maxim Nikolaev, Saint-Petersburg (RU); Denis Marin, Saint-Petersburg (RU)

(73) Assignee: Quantenna Communications, Inc., Fremont, CA (US)

( * ) Notice: Subject to any disclaimer, the term of this patent is extended or adjusted under 35 U.S.C. 154(b) by 0 days.

(21) Appl. No.: 15/063,491

(22) Filed: Mar. 7, 2016

Related U.S. Application Data

(60) Provisional application No. 62/128,596, filed on Mar. 5, 2015.

(51) Int. Cl.
| | |
|---|---|
| *H04B 7/0452* | (2017.01) |
| *H04B 7/0456* | (2017.01) |
| *H04W 8/26* | (2009.01) |
| *H04W 24/08* | (2009.01) |
| *H04W 72/00* | (2009.01) |
| *H04L 12/54* | (2013.01) |

(Continued)

(52) U.S. Cl.
CPC ......... *H04B 7/0452* (2013.01); *H04B 7/0456* (2013.01); *H04L 1/0025* (2013.01); *H04L 12/56* (2013.01); *H04W 8/26* (2013.01); *H04W 24/08* (2013.01); *H04W 72/005* (2013.01); *H04W 72/044* (2013.01); *H04W 80/04* (2013.01)

(58) Field of Classification Search
CPC .... H04L 12/56; H04L 1/0025; H04W 72/005; H04W 72/044; H04W 80/04; H04W 8/26; H04W 24/08; H04B 7/0452; H04B 7/0456
See application file for complete search history.

(56) References Cited

U.S. PATENT DOCUMENTS

| | | | |
|---|---|---|---|
| 7,027,533 B2 * | 4/2006 | Abe | ......................... H04L 1/005 375/341 |
| 2007/0064692 A1 * | 3/2007 | Pi | ...................... H04L 29/12283 370/389 |

(Continued)

*Primary Examiner* — Janice Tieu
(74) *Attorney, Agent, or Firm* — IP Creators; Charles C. Cary

(57) ABSTRACT

A wireless communication sniffer including: a packet identification module; a channel modeler; single-channel and multi-channel equalization matrix calculators; and an equalizer. The packet identification module identifies a packet as single-user (SU) or multi-user (MU). The channel modeler models the communication channel for the packet as either a set of single-channel or multi-channel parameters responsive to the SU and MU packet identification. The single-channel equalization matrix calculator calculates a single-channel equalization matrix using the set of single-channel parameters, responsive to an SU identification. The multi-channel equalization matrix calculator calculates a multi-channel equalization matrix using the set of multi-channel parameters, responsive to an MU identification. The equalizer equalizes the received communication packet utilizing the single-channel or multi-channel equalization matrix responsive to the SU or MU packet identification respectively.

12 Claims, 5 Drawing Sheets

Time Lapse MU Sniffer Integrated with WiFi Station

(51) Int. Cl.
  *H04W 72/04*  (2009.01)
  *H04L 1/00*  (2006.01)
  *H04W 80/04*  (2009.01)

(56) References Cited

U.S. PATENT DOCUMENTS

2012/0294294 A1* 11/2012 Zhang .................. H04L 1/0025
  370/338
2014/0219397 A1* 8/2014 Chen ....................... H04L 27/16
  375/329

* cited by examiner

MU-MIMO SNIFFER FOR A WIRELESS LOCAL AREA NETWORK

CROSS REFERENCE TO RELATED APPLICATION

This application claims the benefit of prior filed Provisional Applications: No. 62/128,596 filed on Mar. 5, 2015 entitled "MU-MIMO Sniffer Design" which is incorporated herein by reference in its entirety as if fully set forth herein.

BACKGROUND OF THE INVENTION

1. Field of Invention

The field of the present invention relates in general to wireless local area networks including wireless access points (WAP) and wireless stations and methods multi-user concurrent communications with same.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP.

What is needed are improved methods for analyzing wireless communications on the wireless local area network.

SUMMARY OF THE INVENTION

The present invention enables analysis, a.k.a. "sniffling", of wireless communications of both single user and multi-user wireless local area network (WLAN) communications.

In an embodiment of the invention a sniffer apparatus having a plurality of antenna and supporting multiple-input multiple-output (MIMO) reception of WLAN communications between a wireless access point (WAP) node and associated station nodes is disclosed. The sniffer apparatus includes: a packet identification module; a channel modeler; a single channel equalization matrix calculator; a multi-channel equalization matrix calculator and an equalizer. The packet identification module is configured to identify a received WLAN communication packet as one of a single user (SU) and a multi-user (MU) communication packet. The channel modeler is configured to model a communication channel for the received packet as one of a set of single-channel parameters and a set of multi-channel parameters responsive to the SU and MU packet identification respectively, of the packet identification module The single-channel equalization matrix calculator is responsive to an SU identification of the received packet by the packet identification module to calculate a single-channel equalization matrix for equalizing the received packet based on the set of single-channel parameters from the channel modeler. The multi-channel equalization matrix calculator is responsive to an MU identification of the received packet by the packet identification module to calculate a multi-channel equalization matrix based on the set of multi-channel parameters from the channel modeler. The equalizer is configured to equalize the received communication packet utilizing the single-channel equalization matrix responsive to identification of an SU packet and the multi-channel equalization matrix responsive to identification of an MU packet by the packet Identification module.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

The wireless sniffer disclosed herein, is able to analyze all types of WLAN packets including both single user and multi-user packets. It is not associated with any WLAN, and can listen to each node, WAP or Station of any node within range. Sniffers are particularly useful for setting up Enterprise WLANs and diagnosing problems therewith.

Figure 1:
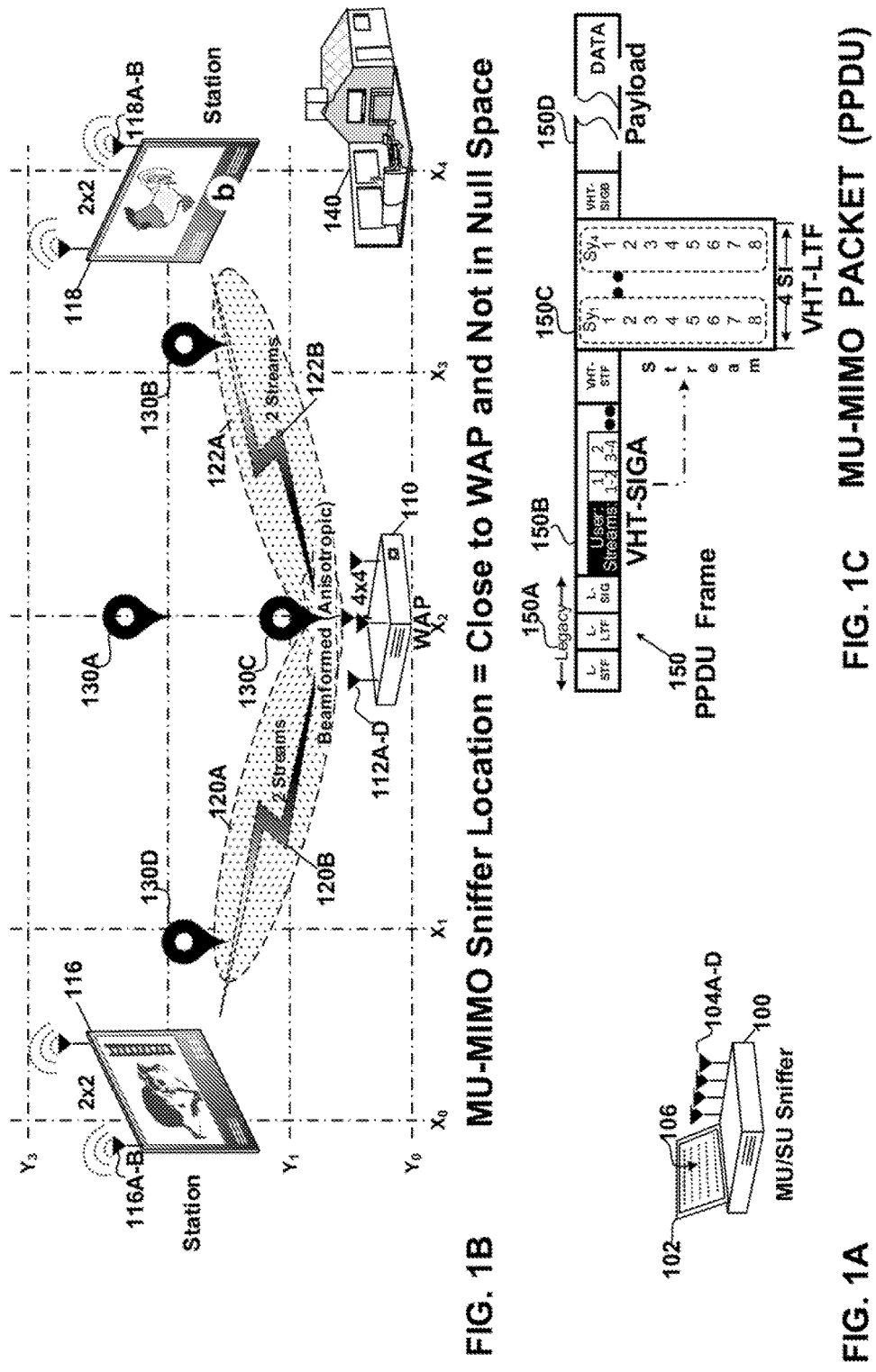
FIGS. 1A-C are respectively a hardware view, a system view, and a data processing diagram, of a sniffer for analyzing wireless local area networks (WLAN) in accordance with an embodiment of the invention.

FIGS. 1A-C are respectively a hardware view, a system view, and a data processing diagram, of a sniffer for analyzing wireless local area networks (WLAN) in accordance with an embodiment of the invention;

FIG. 1A shows the sniffer 100 having a plurality of antenna 104A-D for reception of multiple-input multiple-output (MIMO) wireless communication packets between any of the wireless local area network nodes (WLAN) nodes shown in FIG. 1B. As each packet is "sniffed" its key parameter 106 are displayed on the sniffers display 102. The sniffer may be handheld, or mobile.

FIG. 1B shows a home 140 with a WLAN consisting of an 4×4 WAP node 110 and two 2×2 HD TVs 166-118. The WAP 110 is referred to as a 4×4, because it has 4 antenna 1102A-D over which up to 4 discrete communication streams can be sent or received. The TV 116 is referred to as a 2×2, because it has 2 antenna 116A-B over which up to 2 discrete communication streams can be sent or received. The TV 118 is referred to as a 2×2, because it has 2 antenna 118A-B over which up to 2 discrete communication streams can be sent. The WAP 112 is shown in communication with the two TVs 116-118 simultaneously, over concurrent links 120B and 122B. These concurrent links are referred to as MU-MIMO downlinks, because they involve a single packet being sent to two or more stations at once, with discrete data for each targeted node, (a.k.a. station or user). In this case the data involves simultaneous downlinks of different TV channels to each of the targeted TVs. The WAP can only communicate simultaneously with two or more MU targets if it can spatially separate its downlink transmission so that the corresponding streams destined of one station do not arrive at the other MU stations and vice-versa. This spatial separation of the downlink transmission, which beamforms the MU packet in two or more directions at once towards the targeted MU stations is represented by the two anisotropic beamformed RF signal strength lobes 120A-122A shown in FIG. 1B directed from the WAP 112 to each of the target stations 116-118. In order for the WAP to generate these beamformed RF signal strength patterns, it must first have enough channel state Information (CSI) from each of the MU-MIMO targeted stations to assemble the precode matrix "Q" necessary to accomplish this spatial mapping of the prospective MU downlink. The sniffer 100 is able to analyze these MU packets, due to its multi-channel modeling capabilities. Several possible locations 130A-D for the sniffer are shown. The optimal one of these, e.g. location 130C is near the transmitting WAP, and outside of any spatial nulls associated with the RF signal profile.

FIG. 1C shows one type of WLAN packet, e.g. a Payload Data Unit (PPDU). The PPDU shown in this example is identified as a multi-user (MU) packet based on information contained in control field 150B, i.e. VHT-SIGA. A multi-user PPDU packet contains precoded data of separate streams spatially targeted for different users. A single-user (SU) PPDU packet has similar field breakdowns as the MU packet but identifies itself in the control field 150B as a SU packet containing multiple precoded streams destined only for one user/station. The PPDU frame 150, as specified in the IEEE 802.11ac standard for example, includes: a legacy portion 150A, and a very high throughput portion (VHT) consisting of various control, training and payload fields shown. The legacy portion includes the: L-STF, L-LTF and L-SIG fields. All stations whether or not MU compliant, can listen to the legacy portion for WLAN collision avoidance, e.g. carrier sense multiple access (CSMA), and for synchronizing reception.

The VHT control portion includes: the VHT-SIG A field 150B, the VHT-STF and VHT-SIG B. The VHT-SIGA field contains bits which indicate whether the packet is SU or MU and what user(s), a.k.a. station(s) are going to receive what streams in the case of an MU-MIMO downlink. In the example shown the VHT-SIGA field indicates user 1/station 116 will be receiving streams 1-2 of the MU MIMO downlink and user 2/station 118 will be receiving streams 3-4.

The VHT training portion includes the: VHT-LTF field 150C. The known training symbols in this field are used by the receiving station and by the sniffer to determine how much the channel between the WAP and station has altered the known training vector and this information is used by the receiving station and sniffer to improve reception of the payload portion 150D of the packet 150. The VHT payload portion 150D of the PPDU frame may contain from 1 to over 1000 symbols of data precoded on each of the included streams.

Figure 2:
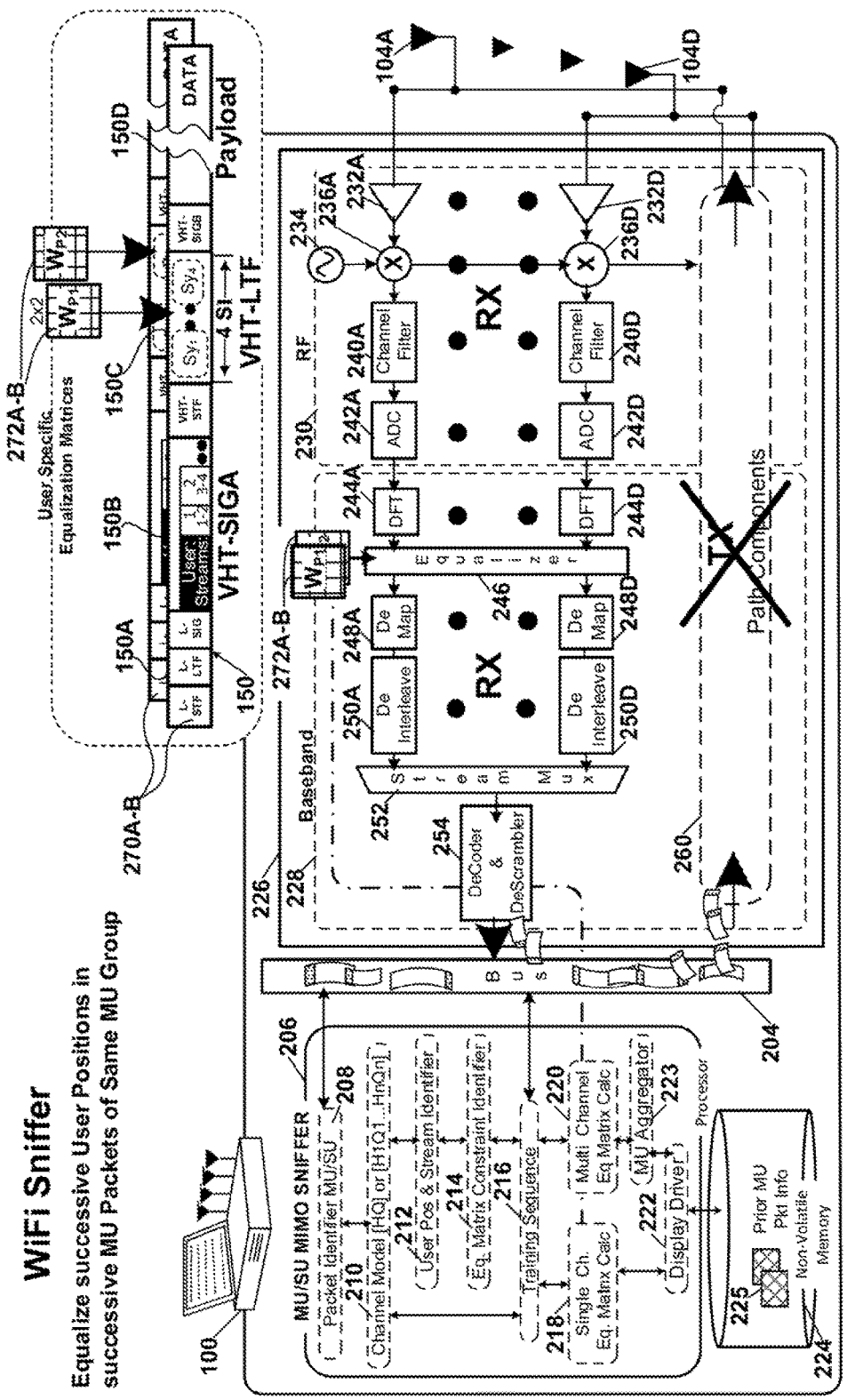
FIG. 2 is a detailed hardware block diagram of an embodiment of the sniffer shown in FIG. 1A.

FIG. 2 is a detailed hardware block diagram of an embodiment of the sniffer shown in FIG. 1A. The sniffer in this embodiment of the invention is able to analyze both SU and MU packets using in the latter case a sequence of time-lapse "sniffs" of successive MU-MIMO downlink packets, e.g. packets 270A-B for a downlink MU group of two users. For each MU packet the sniffer receives one of the two or more user positions and associated streams in the downlink MU packet. Once enough packets have been received to allow the sniffing of each user and associated streams, the sniffer displays the results on its screen or in an associated file.

The embodiment of the sniffer 100 shown in FIG. 2 only requires a receive path components to perform its function. The sniffer has four antenna 104A-D. The sniffer supports single user (SU) MIMO as well as multi-user (MU) MIMO reception. The sniffer includes: an MU/SU MIMO sniffer controller 206, and a wireless local area network (WLAN) receive stage 226 which includes four discrete MIMO receive paths capable of reception of from one to four streams. Only two receive paths are shown in detail for clarity. The transmit path components 260 are not required.

The sniffer receive path components include antennas 408A-D. The antennas are coupled to radio frequency (RF) module 230 and baseband module 228 of the WLAN stage 226, which implements in an embodiment of the invention the IEEE 802.11* standard for WLAN, with the '*' standing for the particular sub-standard, e.g. a, b, g, n, ac, ax.

A first MIMO receive path originates with the antenna 104A, and Includes: low noise amplifier (LNA) 232A, the shared tunable oscillator 234 and mixer 236A which down converts the received data channel, for filtration by the channel filter 240A, conversion in the analog-to-digital converter (ADC) 242A and domain conversion from the frequency to the time domain in the DFT module 244A. The corresponding MIMO components of the remaining receive paths are labeled with different suffix, e.g. suffix "D" for the components of the fourth receive path.

In the baseband module 428 the complex coefficients for each sub-channel in each symbol interval are subject to equalization in equalizer 246 using a user and stream specific one of the limited multi-channel equalization matrices 272A-B as determined by the MIMO sniffer controller 206 and specifically the multi-channel equalization matrix calculator 220 thereof. Next, any equalized stream is demapped by a corresponding one of the pairs of demappers 248A-D and deinterleavers 250A-D. Next, the received data of the stream(s) for one of the MU users is multiplexed in stream multiplexer 252 and decoded and descrambled in the decoder and descrambler 254 which couples to the packet based bus 204.

The transmit path components 260 are shown with an "X" to indicate they are not required by the sniffer.

The sniffer receive path components operate under control of the MU/SU MIMO sniffer controller 206. The sniffer controller includes: a packet identifier 208; a channel modeler 210, a user position and Stream Identifier 212, an Equalization Matrix constraint identifier 214; a training sequence input 216, a single-channel equalization matrix calculator 218 and a multi-channel equalization matrix calculator 220; an MU aggregator 223, and a display driver 222; all of which are coupled to non-volatile memory or storage 224.

The packet identifier 208 is configured to identify a received WLAN communication packet as one of a single user (SU) or a multi-user (MU) communication packet based on the information contained in one of the control fields, e.g. VHT-SIGA 150B.

The channel modeler 210 is configured to model a communication channel for the received packet as one of a set of single-channel parameters and a set of multi-channel parameters responsive to the SU and MU packet identification respectively, of the packet identification module;

The user position and Stream Identifier 212 is configured in the case of an identified MU packet, to identify all user positions and associated MU stream or streams allocated thereto.

The Equalization Matrix constraint identifier 214 is configured to utilize the user positions and associated streams, to determine the row limit on the dimension of the multi-channel equalization matrix determined by the multi-channel equalization matrix calculator 220 in each successive packet. In the example shown the number of streams for each user position 1 & 2 in the VHT-SIGA field 150B is 2. Thus, the multi-channel equalization matrix 272A used to extract data for user 1 is 2×2. The multi-channel equalization matrix 272B used to extract data for user 2 is also 2×2. MU users in an MU packet need not be targeted with the same number of streams, thus the equalization matrix constraint identifier, will identify different equalization matrix row dimensions depending on the number of streams allocated to that user in the MU-MIMO downlink packet.

The training sequence input 216 provides the training portion 150C, e.g. VHT-LTF of the received packet 150 as an input to the single or multi channel matrix calculators 218, 220 depending on the type of packet being equalized.

The single-channel equalization matrix calculator 218 is responsive to an SU identification of the received packet by the packet identification module to calculate a single-channel equalization matrix for equalizing the received packet based on the set of single-channel parameters from the channel modeler and a training sequence in a received packet.

The multi-channel equalization matrix calculator 220 is responsive to an MU identification of the received packet by the packet identification module to calculate a multi-channel equalization matrix based on the set of multi-channel parameters from the channel modeler and a training sequence in a received packet.

The MU aggregator 223 aggregates the equalized and multiplexed payload streams from successive packets to the same MU-MIMO downlink group to provide a composite "time lapse" analysis of the MU-MIMO downlink, for display on a display driven by the display driver 222.

The non-volatile memory or storage 224 contains prior MU packet information stored by the MIMO sniffer controller on each successive packet to the same MU Group, until all steams associated with all user positions and associated streams have been analyzed, at which point they are displayed.

In an embodiment of the Invention the MIMO sniffer module may be instantiated on a processor running program code (not shown) stored in non-volatile memory 224, without departing from the scope of the claimed invention.

Figure 3:
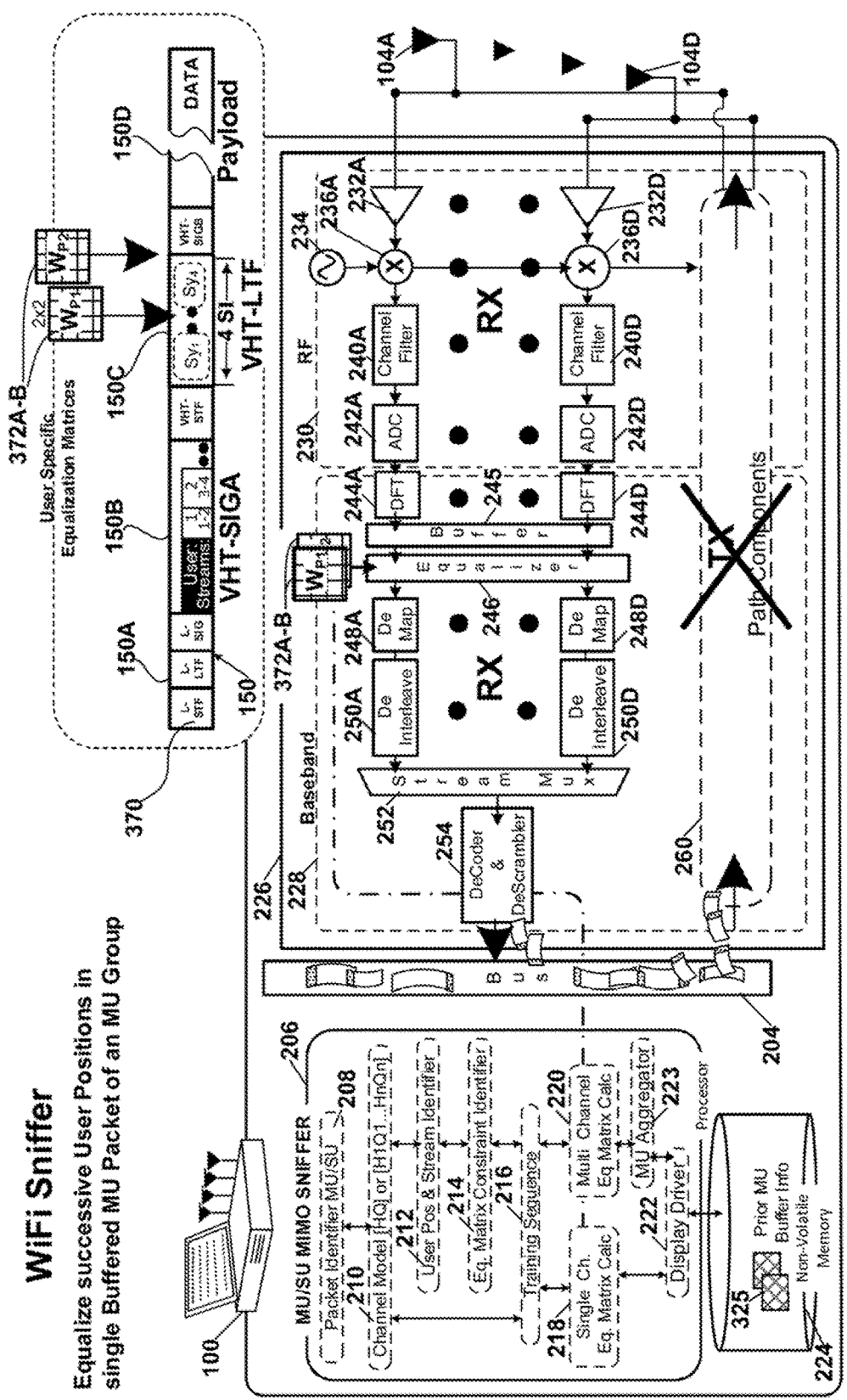
FIG. 3 is a detailed hardware block diagram of an other embodiment of the sniffer shown in FIG. 1A.

FIG. 3 is a detailed hardware block diagram of an other embodiment of the sniffer shown in FIG. 1A. The embodiment of the sniffer is identical to that shown in FIG. 2 in all respects except, for the addition of a buffer 245 between the DITs 244A-D and the equalizer 246. This buffer stores a single received packet 370 for successive processing where required, as in the case of an MU packet. Rather than identifying included users and streams by incremental processing of a single user in each successive MU packet to the same MU group as was the case in the embodiment of the invention shown in FIG. 2, the instant embodiment buffers the packet thereby allowing successive processing of all targeted users and streams in the packet by resort to the buffer on each baseband pass. The row limited equalization matrix 372A or 372B used on each pass allows the associated payload for one selected user to be analyzed on each pass. Once each user position in the packet has been analyzed, the sniffer displays the results on its screen. This embodiment of the invention is identified as a "snap shot" embodiment, since the buffer stores each received packet during multipass baseband analysis of each user and associated streams. After complete analysis the buffer is refreshed with the next received SU/MU packet.

Figure 4:
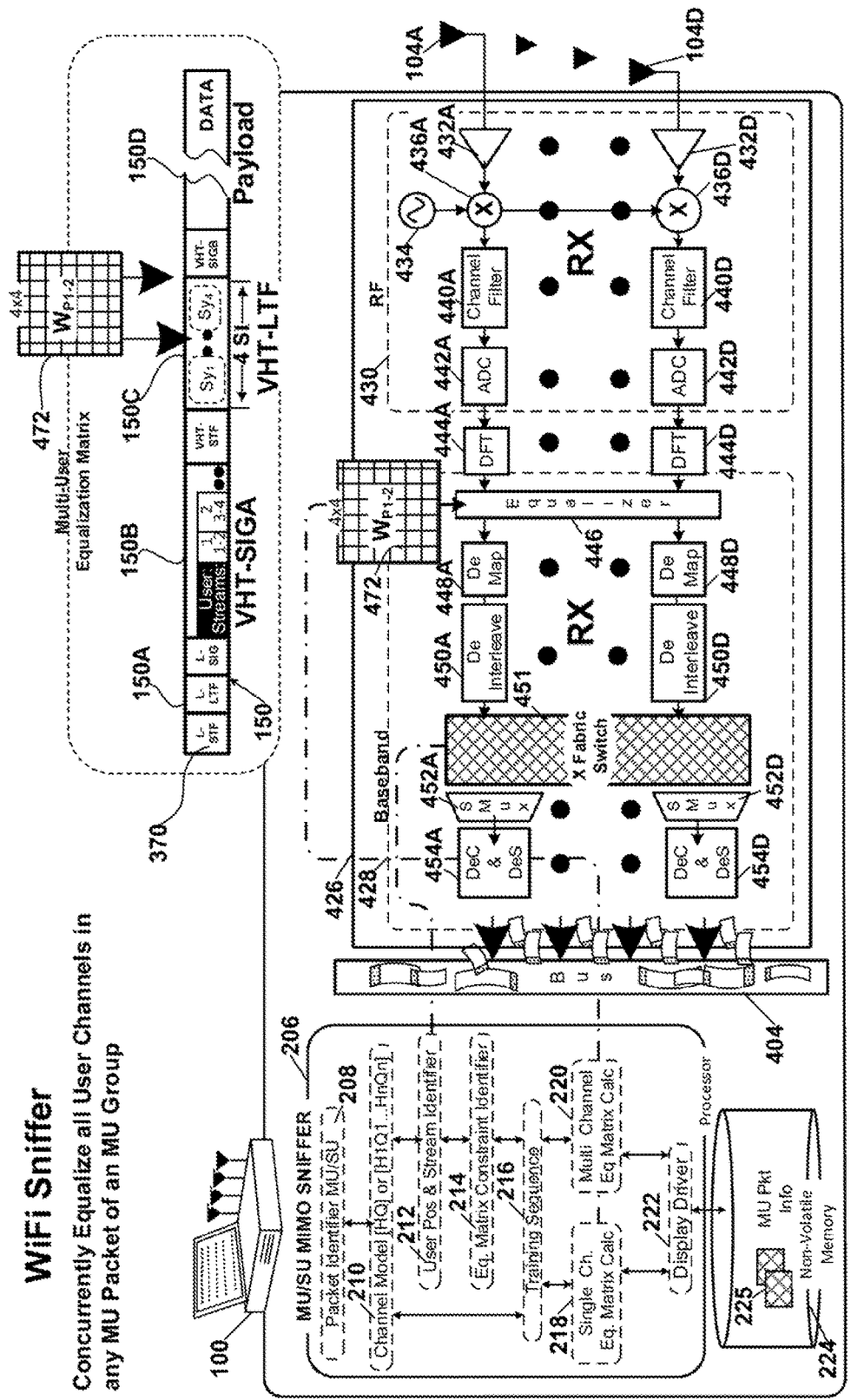
FIG. 4 is a detailed hardware block diagram of still another embodiment of the sniffer shown in FIG. 1A.

FIG. 4 is a detailed hardware block diagram of still another embodiment of the sniffer shown in FIG. 1A. The sniffer in this embodiment of the invention is able to analyze both SU and MU packets in "real time", thanks to dedicated baseband receive path components which allow all MU user positions identified in the packet and associated streams to be baseband processed concurrently and displayed on the sniffer screen.

The embodiment of the sniffer 100 shown in FIG. 4 only requires receive path components to perform its function. The sniffer has four antenna 104A-D. The sniffer supports single user (SU) MIMO as well as multi-user (MU) MIMO reception. The sniffer includes: an MU/SU MIMO controller 206, and a wireless local area network (WLAN) receive stage 426 which includes four discrete MIMO receive paths capable of reception of from one to four streams. Only two receive paths are shown in detail for clarity.

The sniffer receive path components include antennas 408A-D. The antennas are coupled to radio frequency (RF) module 430 and baseband module 428 of the WLAN stage 426, which implements in an embodiment of the invention the IEEE 802.11* standard for WLAN, with the '*' standing for the particular sub-standard, e.g. a, b, g, n, ac, ax.

A first MIMO receive path originates with the antenna 104A, and includes: low noise amplifier (LNA) 432A, the shared tunable oscillator 434 and mixer 436A which down converts the received data channel, for filtration by the channel filter 440A, conversion in the analog-to-digital converter (ADC) 442A and domain conversion from the frequency to the time domain in the DFT module 444A. The corresponding MIMO components of the remaining receive paths are labeled with different suffix, e.g. suffix "D" for the components of the fourth receive path.

In the baseband module 428 the complex coefficients for each sub-channel in each symbol interval are subject to equalization in equalizer 446 using a full, e.g. 4×4, multi-channel equalization matrix 472 concurrently equalizing all included users and associated streams, as calculated by the multi-channel equalization matrix calculator 220. Next, any equalized stream is demapped by a corresponding one of the pairs of demappers 248A-D and deinterleavers 250A-D.

Next, the cross fabric switch 451, under control of the user position and stream identifier 212, switchably couples the receive path(s) for each stream(s) associated with each user to a single one of a plurality of stream multiplexers and decoder descrambler pairs for concurrently demodulating the payload data associated with each user position and associated streams. The cross fabric switch allows the various equalized streams from the payload portion of the MU packet to be selectably combined with one another in correspondence with the user positions identified in the MU packet by the packet identifier. In the example shown in FIG. 4 there are four stream multiplexer and decoder-descrambler pairs. In the instant example, with two users in the MU downlink group with two streams each the following connections are made by the cross fabric switch under control of the user position and stream identifier 212. Baseband receive path components denoted by the "A" and "B" suffixes (latter not shown) are coupled to the single stream multiplexer 452A and decoder-descrambler 454A pair. Baseband receive path components denoted by the "C" (not shown) and "D" suffixes are coupled to another one of the multiplexer decoder scrambler pairs, e.g. the single stream multiplexer 452D and decoder-descrambler 454D pair.

Figure 5:
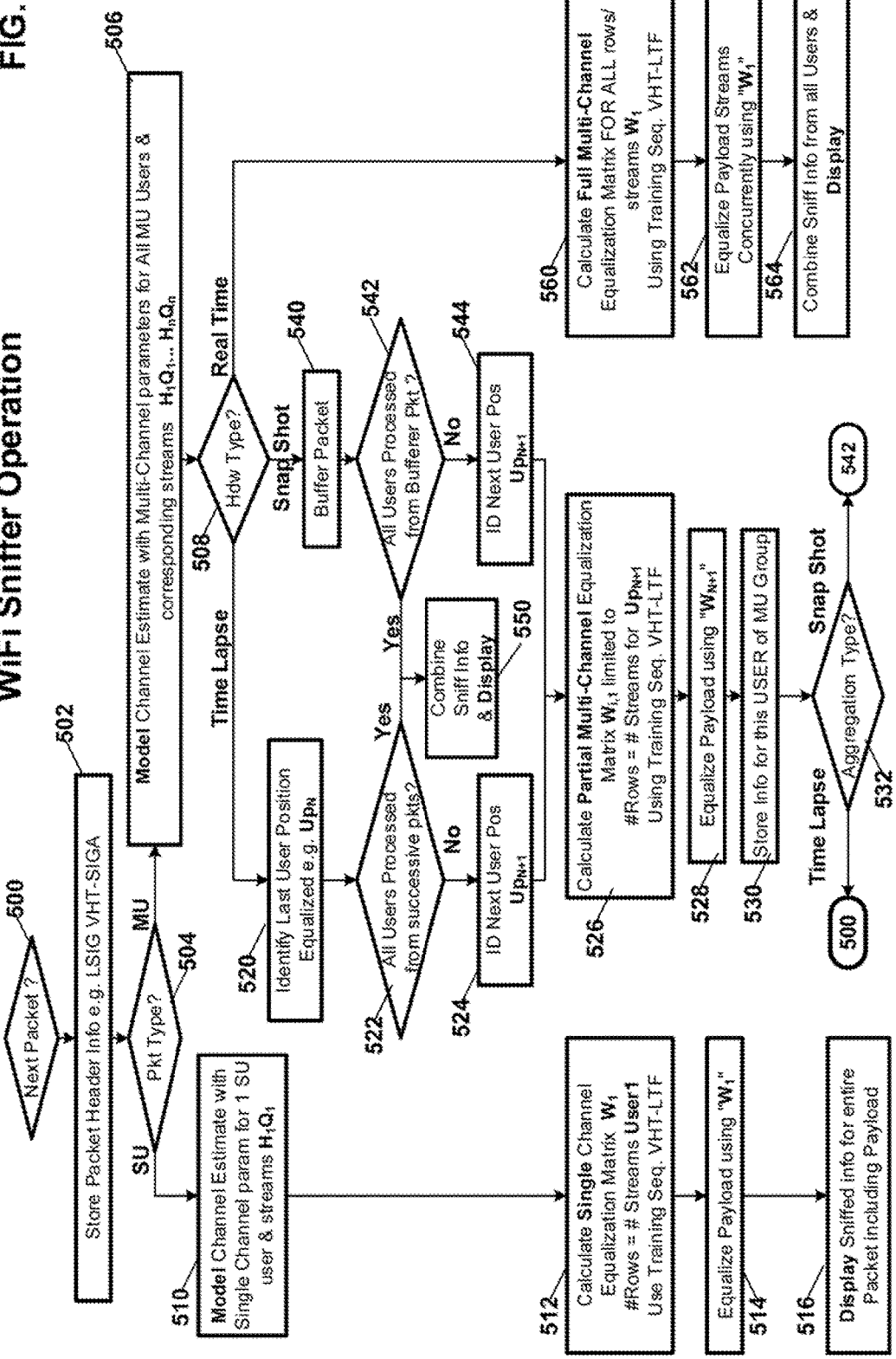
FIG. 5 is a process flow diagram of processes associated with the sniffer shown in all embodiments of the invention.

FIG. 5 is a process flow diagram of processes associated with the sniffer shown in all embodiments of the invention. Processing begins in decision process 500 with the receipt of the next packet. Control is then passed to process 502 in which the packet header is analyzed to determine: Packet type; e.g. PPDU-SU, PPDU-MU or NDP-SU, NDP-MU; packet length; beamforming; precoding; packet modulation and coding schema (MCS); MU user positions and number of allocated streams; etc. In the case of an IEEE 802.11ac compliant packet this information is found in the L-SIG, and VHT-SIGA portions of the packet. This information is then stored for later presentment with the corresponding payload information determined in the following processes.

Control then passes to decision process 504 for a determination of packet type, e.g. single-user (SU) or multi-user (MU). If the packet is identified as targeted for a single user or node then control is passed to process 510. In process 510 a model of the channel is generated. For an SU packet the channel model for the channel estimate is a set of single channel parameters for the single targeted receiving node and associated streams, e.g. $H_1Q_1$ where $H_1$ is the channel between the packers transmitting node and the sniffer, and $Q_1$ is the precoding matrix applied by the transmitter. Control is then passed to process 512 in which a Single-Channel Equalization Matrix $W_1$ is calculated having a row dimension corresponding to the number of streams targeted for the user as identified in process 502 from the control field, e.g. VHT-SIGA field 150B, of the packet. The equalization matrix $W_1$ is calculated using inputs provided by the known training sequence in the received packet provided by the training field 150C e.g. VHT-LTF field, and the set of single channel model parameters determined in process 510. Next in process 514 the payload portion of the received SU packet is demodulated using the single-channel equalization matrix $W_1$. Next, in process 516 the combined control information from process 502 and the payload contents equalized and subject to remaining baseband multiplexing and decoding/descrambling operations is displayed by the sniffer. The scrollable display, shows successive sniffed packets and associated control and payload information.

If alternately a determination is made in decision process 504 that the packet is of a multi-user (MU) type with discrete data for two or more users, then control passes to process 506. In process 506 a model of the channel is generated. For an MU packet the channel model for the channel estimate is a set of multi-channel parameters for the multiple targeted receiving nodes and associated streams, e.g. $H_1Q_1 \ldots H_nQ_n$ where the suffix denotes the distinct channel and precode matrix used by the transmitting node to target each associated one of the MU users. Control is then passed to decision process 508 for a determination of the hardware type of the associated sniffer.

If the sniffer follows the time-lapse embodiment of the invention shown in FIG. 2 then control passes from decision process 508 to process 520. In process 520 the last user position, e.g. $Up_N$, and associated stream(s) processed by the sniffer for the corresponding MU group are identified by probing storage for any prior obtained sniffer analysis for any users in this MU group. In this embodiment of the invention successive MU packets from the same MU group are processed on the basis of one user position and associated streams per packet. Next, in decision process 522 a determination is made as to whether any user positions remain to be processed. If all user positions and associated streams for the MU Group identified in the packet control field in process 502 have been analyzed then control passed to process 550. In process 550 the stored Information for this MU Group derived from prior processed packets is aggregated and displayed on the sniffer display. Alternately, if there are remaining un-analyzed user positions and associated streams in the MU packet to analyze then control passes to process 524. In process 524 the next user position, e.g. $Up_{N+1}$ and associated streams are Identified. Control is then passed to process 526.

In process 526 a partial multi-channel equalization matrix $W_{i,1}$ is calculated having a row dimension limited to the number of streams targeted for the user as identified in process 524 from the MU MIMO portion of the control field, e.g. the VHT-SIGA field 150B, of the packet. The multi-channel equalization matrix $W_{i,1}$ is calculated using inputs provided by the known training sequence in the received packet provided by the training field 150C e.g. VHT-LTF field, and the set of multi-channel model parameters determined in process 506. Next in process 528 the payload portion of the received MU packet is demodulated using the multi-channel equalization matrix $W_{i,1}$. Next, in process 530 the combined control information from process 502 and the payload contents for the user position and associated streams equalized and subject to remaining baseband multiplexing and decoding/descrambling operations for this baseband iteration is stored in memory for the particular user position and number of streams, and MU Group. Control is then passed to decision process 532 in which a determination is made as to the sniffer aggregation type. If sniffing is being performed incrementally per user position on successive packets, a.k.a. via Time lapse, then control returns to processing off the next packet in decision process 500.

Alternately, if the sniffer follows the snap shot embodiment of the invention shown in FIG. 3 then control passes from decision process 508 to process 540. In process 540 the packet is buffered so that it can be subject to iterative baseband processing to extract the MU-MIMO information for all users and streams. Control then passes to decision process 542 in which a determination as to whether all user positions and associated streams have been processed. If they have control passed to the above discussed process 550 for aggregation of all the stored MU information in the packet and display thereof by the sniffer. Alternately if in decision process 544 it is determined that all user positions in the MU packet and associate streams have not been analyzed then control is passed to process 544. In process 544 the next user position, e.g. $Up_{N+1}$ and associated streams are identified. Control is then passed to the above discussed process 526 in which a partial multi-channel equalization matrix $W_{i,1}$ is calculated having a row dimension limited to the number of streams targeted for the user as identified in process 544 from the MU MIMO portion of the control field, e.g. the VHT-SIGA field 150B, of the packet. The multi-channel equalization matrix $W_{i,1}$ is calculated using inputs provided by the known training sequence in the buffered packet provided by the training field 150C e.g. VHT-LTF field thereof, and the set of multi-channel model parameters determined in process 506. Next in process 528 the payload portion of the buffered MU packet is demodulated using the limited multi-channel equalization matrix $W_{i,1}$. Next, in process 530 the combined control information from process 502 and the payload contents for the user position and associated streams equalized and subject to remaining baseband multiplexing and decoding/descrambling operations for this baseband iteration is stored in memory for the particular user position and number of streams, and MU Group. Control is then passed to decision process 532 in which a determination is made as to the sniffer aggregation type. If sniffing is being performed incrementally per user position on a single buffered packet, a.k.a. via a Snap Shot, then control returns to process the next user position in the buffered MU packet in decision process 542.

Alternately, if the sniffer follows the real time embodiment of the invention shown in FIG. 4 then control passes from decision process 508 to process 560. In process 560 a full multi-channel equalization matrix $W_1$ is calculated having a row dimension corresponding to the aggregate number of streams targeted for the all user positions in the MU packet as identified in process 502 from the MU MIMO portion of the control field, e.g. the VHT-SIGA field 150B, of the packet. The full multi-channel equalization matrix $W_1$ is calculated using inputs provided by the known training sequence in the buffered packet provided by the training field 150C e.g. VHT-LTF field thereof, and the full set of multi-channel model parameters determined in process 506. Next in process 562 the payload portion of the buffered MU packet is demodulated using the full multi-channel equalization matrix $W_1$ to demodulate each user position and associated stream concurrently. In process 562 the entire set of MU-MIMO information obtained for the subject packet is displayed by the sniffer.

General Discussion and Example:

Consider the example of an MU packet containing data for two users. The data for user 1 is denoted as $X_1$. The data for user 2 is denoted as $X_2$. The transmitter precodes the data and sends the following transmission:

$X = Q_1 X_1 + Q_2 X_2$

The precoding coefficients $Q_1$ and $Q_2$ have been chosen such that they result in cancellation of the unwanted data at the respective receivers, i.e.:

$H_1 Q_2 = 0$ $H_2 Q_1 = 0$

Where $H_1$ and $H_2$ are the channels between the transmitter and receivers 1 and 2 respectively. The preamble of the transmitted packet allows each receiver to estimate the channel for each of the streams to its own receive antennas. This means that at receiver 1 for instance, the receiver can estimate both $H_1 Q_1$ and $H_1 Q_2$. The receiver doesn't really use the Information on $H_1 Q_2$ since it assumes the transmitter has done the necessary precoding for to this component to be canceled. As such, a typical receiver will just estimate $H_1 Q_1$ and assume that its received signal has the form:

$R = H_1 Q_1 X_1 + \text{noise}$

Whatever contribution comes from $X_2$ is considered as noise.

By contrast, a more advanced receiver could consider both $X_1$ and $X_2$ as part of the data:

$R = HQ_1 X_1 + HQ_2 X_2 + \text{noise}$

This could be rewritten in matrix form as:

$$R = [HQ_1 \; HQ_2]\begin{bmatrix} X_1 \\ X_2 \end{bmatrix} + \text{noise}$$

The advanced receiver would estimate the matrix channel $[HQ_1 \; HQ_2]$ and use it to try to recover the data vector $$\begin{bmatrix} X_1 \\ X_2 \end{bmatrix}.$$

There is no need for a typical receiver to do this, because the assumption is that the streams not intended for the user will be canceled from the transmission anyway. However, a sniffer that is not collocated with either receiver 1 or receiver 2 will be able to see contributions from both users. In order to process the sniffed data, it need to perform full channel estimation to extract data for the two users.

Three Equalization Strategies:

To recover the transmitted stream, the received signal R needs to be equalized. Three different implementations can be considered.

Single User Equalization with Single-Channel Model:

Only look at channel of your streams all others have been spatially removed at target location by precoding of WAP. In this case, the receiver Ignores all contributions from other users, implicitly assuming they have been removed through precoding. If this is true, the received signal in the Frequency Domain at the output of the IDFTs is:

$R \cong H_1 Q_1 X_1$

Choosing an equalizer coefficient matrix $W_1$:

$W_1 = (Q_1^+ H_1^+ H_1 Q_1)^{-1} Q_1^+ H_1^+$

Dimensions of $H_1$: $N_{RX,1} \times N_{TX}$

The dimensions of $W_1$ are $N_{STS,1} \times N_{RX,1}$

This leads to the equalized signal:

$\hat{X}_1 = W_1 R \cong X_1$

This strategy only works if other streams have been sufficiently suppressed through precoding.

Single User Equalization with Limited Multi-Channel Model:

In this case, the streams of only one of the users are recovered, and no assumption is made about whether the other streams have been cancelled or not. In other words, the most generic from of the received signal is:

$$R_i \cong H_i Q_1 X_1 + H_i Q_2 X_2 = [H_i Q_1 \; H_i Q_2]\begin{bmatrix} X_1 \\ X_2 \end{bmatrix} = H_{i,Q} \begin{bmatrix} X_1 \\ X_2 \end{bmatrix}$$

The following equalizer coefficient is used (for e.g. the first user):

$$W_{i,1} = \text{first } N_{STS,1} \text{ rows of } (H_{i,Q}{}^+ H_{i,Q})^{-1} H_{i,Q}{}^+$$

Dimensions of $H_i$: $N_{RX,i} \times N_{TX}$
The dimensions of $W_{i,1}$ are $N_{STS,i} \times N_{RX,i}$
This leads to the equalized signal:

$$\hat{X}_1 = W_{i,1} R_i$$
$$= \text{first } N_{STS,1} \text{ rows of } (H_{i,Q}^+ H_{i,Q})^{-1} H_{i,Q}^+ H_{i,Q} \begin{bmatrix} X_1 \\ X_2 \end{bmatrix}$$
$$\cong X_1$$

Even if the second user has not been canceled
Sniffer Use:
On the first pass: use $W_{i,1}$. Output of equalizer is:

$$\hat{X}_1 = W_{i,1} R_i$$

On the second pass: use $W_{i,2}$. Output of equalizer is:

$$\hat{X}_2 = W_{i,2} R_i$$

Even if the second user has not been canceled
Multi User Equalization with Full Multi-Channel Model:
In this case, the equalizer extracts all streams, corresponding to all users. The most generic form of the received signal is again:

$$R_i \cong H_i Q_1 X_1 + H_i Q_2 X_2 = [H_i Q_1 H_i Q_2] \begin{bmatrix} X_1 \\ X_2 \end{bmatrix} = H_{i,Q} \begin{bmatrix} X_1 \\ X_2 \end{bmatrix}$$

The following equalizer coefficient is used (for e.g. the first user):

$$W_1 = (H_{i,Q}{}^+ H_{i,Q})^{-1} H_{i,Q}{}^+$$

This leads to the equalized signal:

$$\hat{X} = W_1 R$$
$$\cong \begin{bmatrix} X_1 \\ X_2 \end{bmatrix}$$

Dimensions of $H_i$: $N_{RX,i} \times N_{TX}$
The dimensions of $W_1$ are $(\Sigma_{i=1}{}^2 N_{STS,i}) \times N_{RX,i}$
The streams for both users are present in the end result.

The components and processes disclosed herein may be implemented a software, hardware, firmware, or a combination thereof including program code software, a memory element for storing the program code software and a processor for executing the program code software, without departing from the scope of the Claimed Invention.

The foregoing description of a preferred embodiment of the invention has been presented for purposes of Illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A sniffer apparatus having a plurality of antennas and supporting multiple-input multiple-output (MIMO) reception of wireless local area network (WLAN) communications between a wireless access point (WAP) node and associated station nodes; and the sniffer apparatus comprising:
a packet identification module configured to identify a received WLAN communication packet as one of a single user (SU) and a multi-user (MU) communication packet;
a channel modeler configured to model a communication channel for the received packet as one of a set of single-channel parameters and a set of multi-channel parameters responsive to the SU and MU packet identification respectively, of the packet identification module;
a single-channel equalization matrix calculator responsive to an SU identification of the received packet by the packet identification module to calculate a single-channel equalization matrix for equalizing the received packet based on the set of single-channel parameters from the channel modeler;
a multi-channel equalization matrix calculator responsive to an MU identification of the received packet by the packet identification module to calculate a multi-channel equalization matrix based on the set of multi-channel parameters from the channel modeler; and
an equalizer configured to equalize the received communication packet utilizing the single-channel equalization matrix responsive to identification of an SU packet and the multi-channel equalization matrix responsive to identification of an MU packet by the packet identification module.

2. The sniffer apparatus of claim 1, further comprising:
a user position and stream identifier configured in the case of an identified MU packet, to identify all user positions and associated MU stream or streams allocated thereto; and
a cross fabric switch coupled to the equalizer to switchably combine equalized streams, output by the equalizer from a payload portion of the MU packet, with one another in correspondence with each user position identified in the MU packet by the user position and stream identifier, thereby allowing real time analysis of MU packets by the sniffer.

3. The sniffer apparatus of claim 1, further comprising:
a user position and stream identifier configured in the case of an identified MU packet, to identify all user positions and associated MU stream or streams allocated thereto; and
an equalization matrix constraint identifier coupled to the multi-channel matrix calculator and configured to utilize a selected one of the user position and associated number of streams identified for the MU packet by the user position and stream identifier, to determine a row limit of a limited multi-channel equalization matrix determined by the multi-channel equalization matrix calculator for decoding the data for a selected one of the user positions in the received MU packet.

4. The sniffer apparatus of claim 1, further comprising:
a user position and stream identifier configured in the case of an identified MU packet, to identify all user positions and associated MU stream or streams allocated thereto; and
an MU aggregator to aggregate data from discrete user positions and associated streams identified by the user position and stream identifier in successive MU packets for the same MU group to provide a composite "time lapse" analysis of the MU-MIMO downlink, for display by the sniffer.

5. The sniffer apparatus of claim 1, further comprising:
a user position and stream identifier configured in the case of an identified MU packet, to identify all user positions and associated MU stream or streams allocated thereto; and
an MU aggregator to aggregate data from discrete user positions and associated streams identified by the user position and stream identifier in successive baseband demodulation of a single buffered MU packet to provide a composite "snap shot" analysis of the MU packet, for display by the sniffer.

6. The sniffer apparatus of claim 1, further comprising:
a display for displaying a corresponding one of SU or MU packet info derived from each received packet.

7. A method for operating a sniffer having a plurality of antennas and supporting multiple-input multiple-output (MIMO) reception of wireless local area network (WLAN) communications between a wireless access point (WAP) node and associated station nodes; and the method comprising:
identifying a received WLAN communication packet as one of a single user (SU) and a multi-user (MU) communication packet;
modeling a communication channel for the received packet as one of a set of single-channel parameters and a set of multi-channel parameters responsive to the SU and MU packet identification respectively;
calculating a single-channel equalization matrix for equalizing the received packet based on the modeled set of single-channel parameters responsive to an SU identification of the received packet;
calculating a multi-channel equalization matrix for equalizing the received packet based on the modeled set of multi-channel parameters responsive to an MU identification of the received packet; and
equalizing the received communication packet utilizing the single-channel equalization matrix responsive to an SU identification of the received packet and the multi-channel equalization matrix responsive to an MU identification of the received packet.

8. The method for operating a sniffer of claim 7, further comprising:
identifying all user positions and associated MU stream or streams allocated thereto in a received MU communication packet; and
switchably combining equalized streams of a payload portion of a received MU communication packet, with one another in correspondence with each user position identified in the identifying act, thereby allowing real time analysis of MU packets by the sniffer.

9. The method for operating a sniffer of claim 7, further comprising:
identifying all user positions and associated MU stream or streams allocated thereto in a received MU communication packet; and
utilizing a selected one of the user position and associated number of streams identified in the second identifying act to determine a row limit of a limited multi-channel equalization matrix determined in the second calculating act, for decoding payload data for the selected one of the user positions identified in the received MU packet.

10. The method for operating a sniffer of claim 7, further comprising:
identifying all user positions and associated MU stream or streams allocated thereto in a received MU communication packet; and
aggregating data from discrete user positions and associated streams identified in successive received MU packets for the same MU group to provide a composite "time lapse" analysis of the MU-MIMO downlink, for display by the sniffer.

11. The method for operating a sniffer of claim 7, further comprising:
buffering a received communication packet;
identifying all user positions and associated MU stream or streams allocated thereto in the buffered MU communication packet; and
aggregating data from discrete user positions and associated streams identified in successive baseband demodulation of the buffered MU packet to provide a composite "snap shot" analysis of the MU packet, for display by the sniffer.

12. The method for operating a sniffer of claim 7, further comprising:
displaying a corresponding one of SU or MU packet info derived from each received packet.

* * * * *